TELEPHONE INSTRUMENTS

Filed Nov. 30, 1960 3 Sheets-Sheet 1

INVENTORS
OSKAR EDVIN RUDOLF NORDSTRÖM
PER OLOF RAGNAR PERSSON
BY Hane and Nydick
ATTORNEYS INVENTORS
OSKAR EDVIN RUDOLF NORDSTRÖM
PER OLOF RAGNAR PERSSON
BY Hane and Nydick
ATTORNEYS Jan. 12, 1965 O. E. R. NORDSTRÖM ETAL 3,165,597

TELEPHONE INSTRUMENTS

Filed Nov. 30, 1960 3 Sheets-Sheet 3

INVENTORS
OSKAR EDVIN RUDOLF NORDSTRÖM
PER OLOF RAGNAR PERSSON
BY Hane and Nydick
ATTORNEYS

United States Patent Office 3,165,597

Patented Jan. 12, 1965

3,165,597

TELEPHONE INSTRUMENTS

Oskar Edvin Rudolf Nordström, Hagersten, and Per Olof Ragnar Persson, Linkoping, Sweden, assignors to Telefonaktiebolaget L M Ericsson, Stockholm, Sweden, a corporation of Sweden Filed Nov. 30, 1960, Ser. No. 72,665
Claims priority, application Sweden Dec. 8, 1959
8 Claims. (Cl. 179—164)

This invention refers to cradle switches for telephone instruments. In telephone instruments having such switches there is often provided a lever which is pivoted in a frame, fastened to for example the base plate of the instrument. The lever has one portion that is operated by for example plungers movably seated in the cradle of the instrument casing, and another portion that operates the contact spring assembly, by means of which the instrument is switched from signalling position to the speaking position when the handset is lifted. The lever is operated by a spring, for example a spiral spring, which tends to move the lever into its non-operative condition (the instrument in speaking position). The contact spring assembly can be mounted either on the base plate or directly on the cradle switch frame, for example by means of screws. Usually it is desirable to design the spring assembly as a separate unit which can be adjusted separately and then be mounted in its position in the instrument, so that it is operated by the cradle switch lever. The contact springs are mounted, for example by means of screws, on a separate supporting plate or the like, which plate is fastened by means of other screws to the cradle switch frame, or to the base plate of the instrument. It is in this case necessary to have special screws for the fastening, besides the screws which keep the springs together in the assembly.

The condition for being able to design the spring assembly as a separate unit, which can be adjusted before the mounting in the instrument, is that this mounting can occur in a simple way and at a reasonable expense and so that the adjustment already carried out is not upset.

This invention refers to a device that makes this possible and the invention is characterized by the fact that the above mentioned spring, which tends to move the cradle switch lever into its non-operative condition, is also used for retaining the spring assembly in its position in the cradle switch frame.

Figures 1, 2, 3, 4, 5, 6:
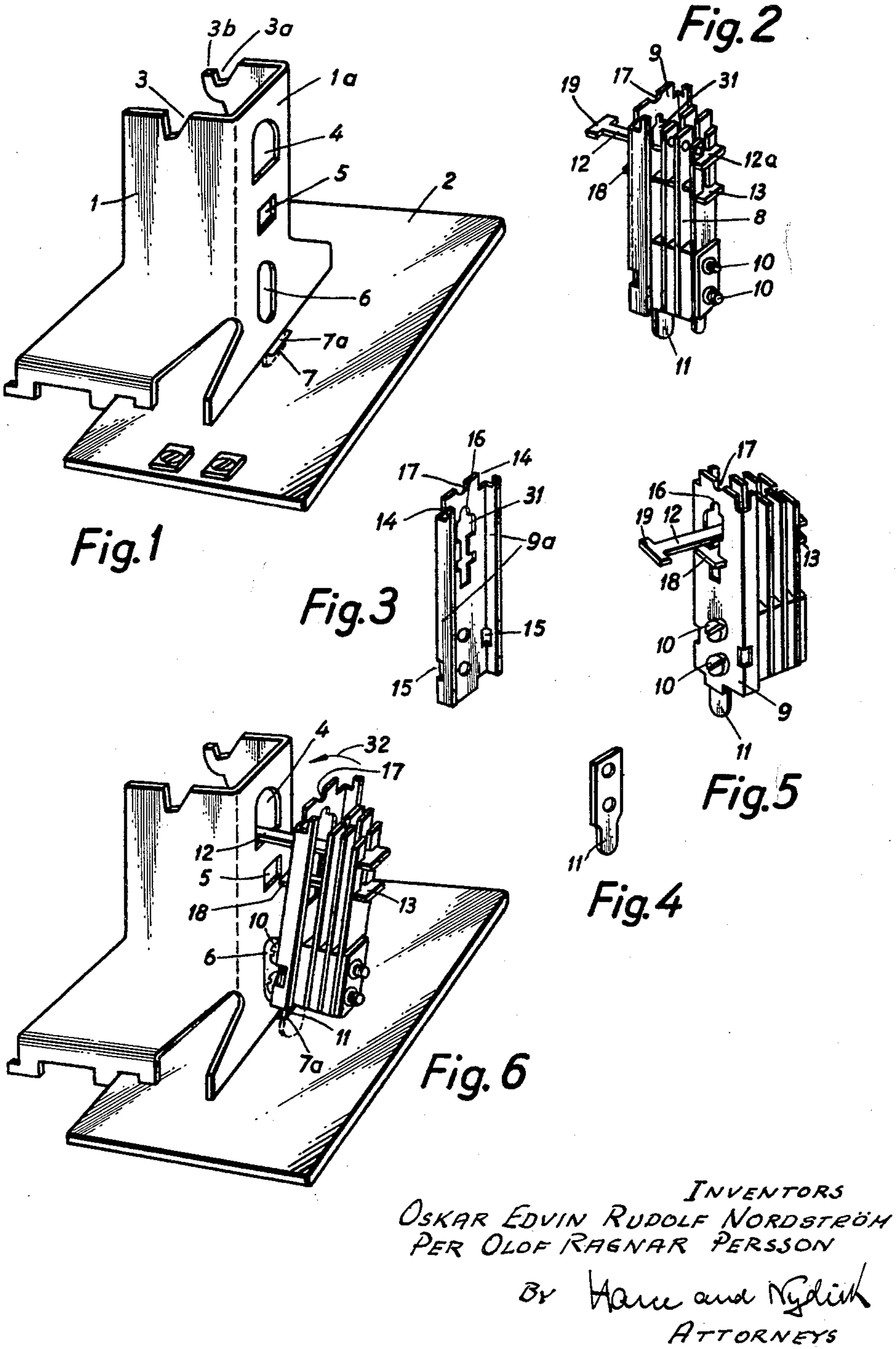
Figures 7, 8, 9, 10, 11:
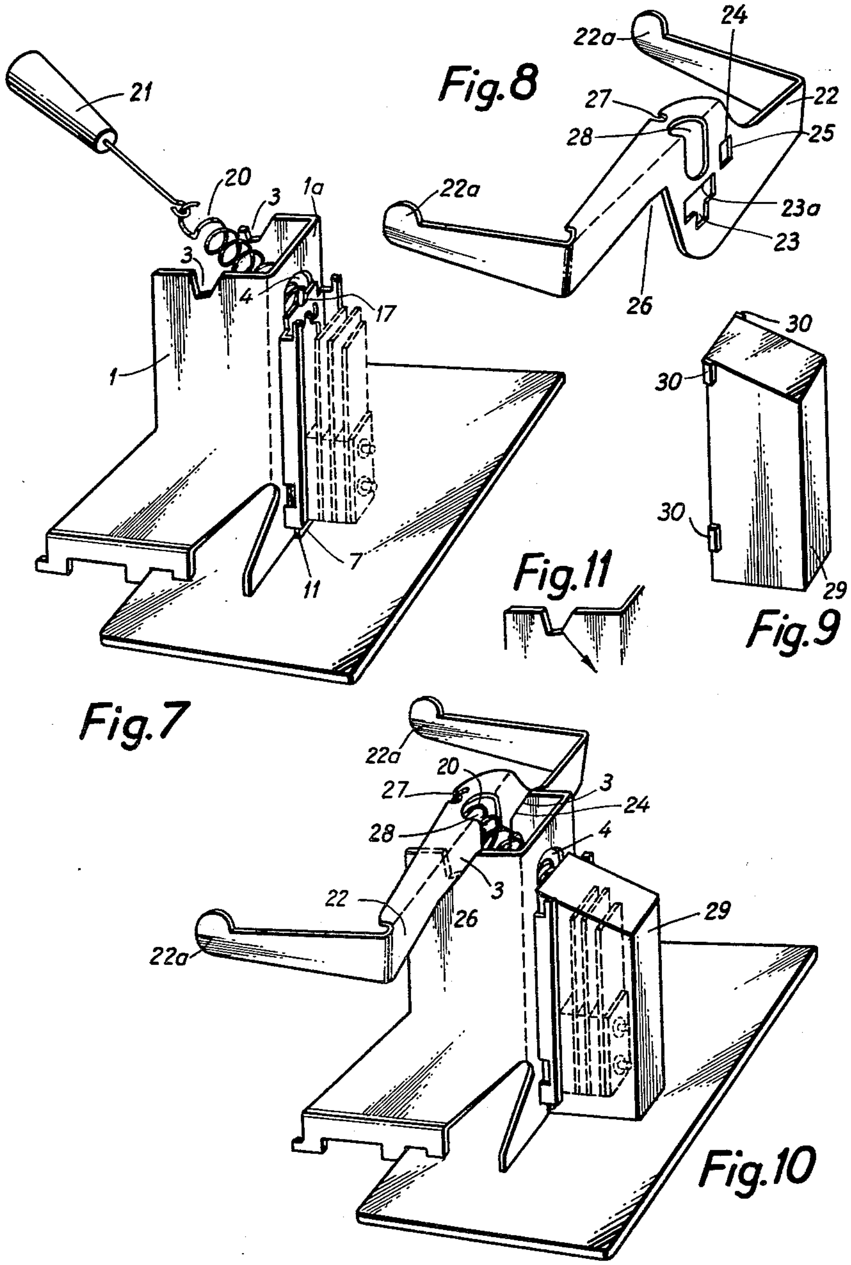
Figure 12:
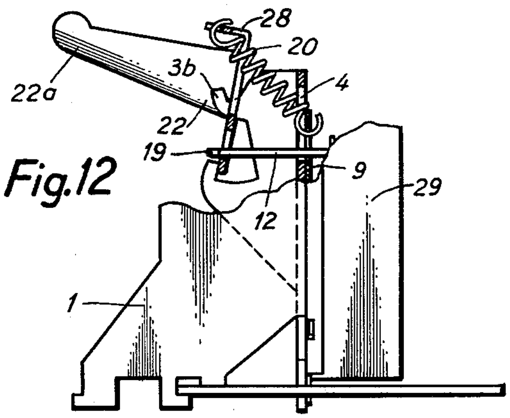
Figure 13:
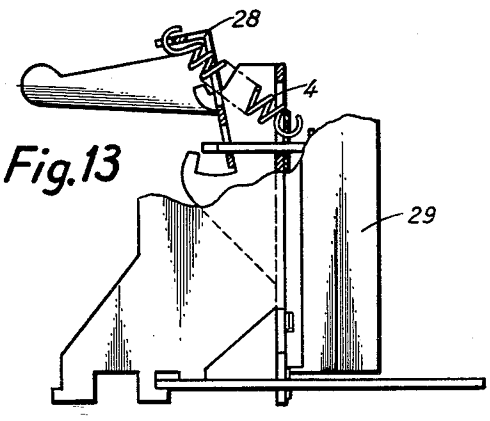

The invention will be further described with reference to the attached drawing, in which FIGS. 1, 6, 7 and 10 show a perspective view of the cradle switch frame fastened on a mounting plate. In FIG. 6 is shown a contact spring assembly in a certain phase of its fastening to the frame. In FIG. 7 is shown another stage of the mounting of the spring assembly on the frame, and in FIG. 10 the spring assembly is shown completely mounted and provided with a box. Here is also shown the cradle switch lever mounted on the frame. FIGS. 2 and 5 show the spring assembly seen in perspective sideways from in front and sideways from behind respectively, and FIGS. 3 and 4 show in perspective a supporting plate for the spring assembly and a guide lug respectively. FIG. 8 is a perspective view of a cradle switch lever, and FIG. 9 shows in perspective a box for the spring assembly. FIG. 11 shows in perspective one of the cradle switch bearings in the frame. FIGS. 12 and 13 show, seen from the side, and with certain portions broken away, the frame and the cradle switch lever mounted on this, in two different positions.

The cradle switch frame 1 (FIG. 1) is fastened to a mounting plate 2 in a manner not described in detail. The plate may be for example a printed-circuit plate. It is not shown in FIG. 1 how the frame 1 is fastened to the plate 2 (for instance as shown in Patent 3,126,454 corresponding to U.S. application No. 51,979), only that a guide lug 7 projecting downwards from the frame is pushed down into an opening 7*a* in the plate 2, which opening is somewhat wider than the thickness of material of the lug 7. In the front wall 1*a* of the frame there are three openings 4, 5 and 6. Furthermore the side-walls are provided with recesses 3 and 3*a* respectively, the bottom of which form bearings for the cradle switch lever 22. This latter is shown in perspective in FIG. 8. The arms 22*a* of the lever are operated in known manner when the handset is lifted and replaced. The lever 22 is provided with three recesses 23, 25 and 28, of which recess 25 is slipped over the hook 3*b* (FIG. 1) when the lever is mounted on the frame 1, so that the upper edge 24 of the opening 25 together with the bottom of the recess 3*a* forms one bearing (knife-edge bearing) for the lever 22. The second bearing is formed by the edge 26 together with the bottom of the recess 3. In FIG. 10 the lever is shown pivoted in the frame. The spring assembly 8, which is to be operated by the movements of the lever, is shown in FIGS. 2 and 5. All contact springs are mounted with their insulating plates on a supporting plate 9 (shown in FIG. 3) by means of two screws 10. Nearest the supporting plate there is mounted a lug 11 (FIGS. 2 and 4) which is passed through by the screws 10 and which projects a distance below the lower edge of the supporting plate 9. The longitudinal edges 9*a* of the supporting plate are turned up. The supporting plate is provided with an opening 31, provided with a notch 16 at the top. In the upper edge of the supporting plate there is a notch 17. The turned up edges 9*a* have each two recesses 14, 15. For operation of the contact springs and for the setting of a desired spring position two ribs are provided, a guide rib 13 and an operating rib 12. Rib 13 fixes the distance between the springs 8 in the resting position, and rib 12 constitutes an operating means. During assembly, the lever 22 is placed on its bearings 24 and 26 in the frame 22. Then the lug 11 in the spring assembly is pushed down into the hole 7*a* in the plate 2 (FIG. 6), whereupon the assembly is turned towards the frame in the direction of the arrow in FIG. 6, the screw heads 10 being pushed into the opening 6 of the frame. This opening should be so formed that the upper edge of the hole 6, by cooperation with the upper screw 10, blocks the supporting plate 9 from being pulled upwards, and so that at least one of the screw heads also gives lateral guiding in the hole 6. The outer, wider end 18 of the rib 13 also guides the supporting plate 9 against movement to the sides, as the width of the end 18 substantially corresponds with the width of the hole 5 in the frame. The operating rib 12 projects freely into the hole 4 in the frame, and the wider end 19 of the rib can be carried along by the lever 22. For this latter purpose there is in the lever (FIG. 8) a recess having a wider portion 23*a* and a narrower portion 23. When the operating rib 12 is to be fastened in the lever, its shoulder 19 (FIG. 2) is pushed into the recess 23*a* so that the neck of the rib can be pressed down into the narrower portion 23 of the recess with the shoulder 19 gripping the lever 22 at the back. When the lever 22 (by a spiral spring) is turned so that the arms 22*a* are brought upwards (which corresponds to the handset being lifted) to the position shown in FIG. 10, the lever carries the rib 12 with it, which hereby operates the contact springs 8.

The rib 12 is at the springs formed with shoulders, which grip some of the springs at the back. FIG. 2 shows the shoulder 12*a* which grips the first spring in the assembly. In FIG. 2 the spring assembly is shown in its inactive position (the springs relaxed) and as a result the springs move the rib 12 into the position shown in the figure.

This corresponds to the fact that the lever is in a position, in which it is pressed down by the handset. When the handset is lifted, the lever 22 will turn under influence of a spiral spring 20 into the position shown in FIG. 10 (the instrument is in speaking position) and the lever now carries the rib 12 with it so that the contact springs are operated and switch the instrument from its signalling position to its speaking position. The above mentioned spring 20 (the return spring), which causes turning of the lever, when the handset is lifted, is fastened in the following manner (FIGS. 7 and 10). When the lever 22 and the spring assembly 8 are placed in their places in the frame, one end of the spring 20, that forms a hook, is hooked around the notches 16 and 17 in the supporting plate 9 shown for example in FIG. 5. The other end of the spring 20, FIG. 7 (in order not to complicate the drawing, the lever 22 not drawn) is then gripped by means of a tool 21 and is hooked over the notch 27 in the upper portion of the lever as is shown in FIG. 10. The spring is now fixed in its correct position and gives a torsional moment to the lever 22 simultaneously as it presses the spring assembly against the frame. The springs of the spring assembly are suitably so arranged that the operating rib 12 must be pulled towards the frame (which corresponds to the fact that the arms 22*a* of the lever 22, when the handset is lifted, are brought upwards) in order to overcome the spring tension of the springs. As a result, the spring assembly is pressed against the frame. The now described spring 20 works in known manner as return spring for the lever 22 with a varying moment-arm, see FIGS. 12, 13. The spring operates the lever at a point that has approximately the same distance to the two bearing points 24 and 26. The pressure will thus be equally distributed on the two bearing points. In one end position, FIG. 13, of the lever 22 (depressed position) it is desirable that the moment-arm, that is, the perpendicular distance between the longitudinal axis of the spring and the axis of rotation of the lever, shall be very short, and therefore the spring is arranged in a recess 28 in the lever. In FIG. 11 there is shown how the pulling strain from the spiral spring 20 will cause a bearing pressure in the recess 3 in the frame directed downwardly and approximately in the direction of the arrow, which pressure holds the lever in its place. The spiral spring will also impart a torsional movement to the lever and holds the spring assembly on its place. The spring assembly 8 can be protected by a box 29, FIGS. 9, 10, for example of plastic material that is held by means of ears 30, which fit recesses 14, 15 in the supporting plate, FIG. 3. Above has been stated that the lug 11 (FIG. 2) on the spring assembly is pushed down into the same opening 7*a* in the mounting plate 2 as the one into which the lug 7 of the frame is pushed. If the frame has no lug 7 there must of course be provided a hole 7*a* in the plate 2 for the lug 11. The spiral spring, which operates the lever, can of course be replaced by a spring formed in another way.

We claim:

1. In a telephone instrument, in combination, a support frame, a cradle switch means pivotally supported on said frame, contact springs for switching the instrument from a signalling condition to a speaking condition and vice versa, a mounting member mounting said contact springs, said cradle switch means switching in one pivotal position said contact springs to the signalling condition of the instrument and in another pivotal position to the speaking condition, and a spring means secured to said cradle switch means and to said mounting member, said spring means biasing the cradle switch means into the pivotal position corresponding to the instrument being in speaking condition and biasing the mounting member against said frame.

2. A telephone instrument according to claim 1 wherein said spring means is secured at one end to said switch means and at the other end to said mounting member to bias the latter against said support frame.

3. An instrument according to claim 1 and comprising a mounting plate having a receiving opening therethrough, said support frame including a wall portion secured to said mounting plate and constituting an abutment for said mounting member, fastening means extending through said contact springs and through said mounting member to secure said contact springs to one side of the mounting member, and a lug protruding from one end of the mounting member and secured to the same and the contact springs by said fastening means, said lug being engaged with said receiving opening when said spring means biasing said mounting member against said wall portion of the frame.

4. An instrument according to claim 3 wherein said fastening means comprise at least one headed screw, the head of the screw protruding on the side of the mounting member opposite to the one supporting the contact springs, said wall portion of the support frame including an opening receiving said screw head to block displacement of the mounting member in the direction for withdrawing said lug from said opening and transverse to said direction.

5. An instrument according to claim 1 wherein said cradle switch means is formed with two bearing edges and said frame is formed with two notches receiving said bearing edges for pivotal support of the cradle switch in reference to said frame, and wherein said spring means comprise a spiral spring having a longitudinal axis disposed in a plane substantially perpendicular to the pivot axis of the cradle switch.

6. A telephone instrument according to claim 1 wherein said spring means is a spiral spring and wherein said cradle switch means has an apertured portion, said spring extending through said apertured portion, one end of the spring being secured to the cradle switch means and the other to said mounting member.

7. A telephone instrument according to claim 1 wherein said support frame includes a wall portion having an opening therethrough and wherein a locating bar is extended through said contact springs to locate the positions of the contact springs relative one to another, said bar protruding from a side of the mounting member facing said frame and the protruding portion of the bar being engageable with the opening in said wall portion to prevent displacement of the mounting member transverse of the frame and the contact springs.

8. A telephone instrument according to claim 1 and comprising a mounting plate having a receiving opening therethrough, said support frame including a wall portion secured to said mounting plate and constituting an abutment for said mounting member, fastening means extending through said contact springs and through said mounting member to secure said contact springs to one side of the mounting member, a lug protruding from one end of the mounting member and secured to the same and the contact springs by said fastening means, said lug being engaged with said receiving opening in the mounting plate when said spring means bias the mounting member against said wall portion of the frame, said wall portion having an opening therethrough, and a locating bar extending through said contact springs to locate the position of the contact spring relative one to another and protruding from the mounting member on the side thereof facing said wall portion, said protruding portion of the bar being engageable with the opening in said wall portion to prevent displacement of the mounting member transverse of the frame and the contact springs.

No references cited.